(12) United States Patent
Marin

(10) Patent No.: US 10,179,990 B1
(45) Date of Patent: Jan. 15, 2019

(54) METHOD FOR TRACKING THE LOCATION OF A SEWAGE HOSE THROUGH DARK SEWAGE PIPES

(71) Applicant: Luca Marin, Temecula, CA (US)

(72) Inventor: Luca Marin, Temecula, CA (US)

( * ) Notice: Subject to any disclaimer, the term of this patent is extended or adjusted under 35 U.S.C. 154(b) by 0 days.

(21) Appl. No.: 15/705,173

(22) Filed: Sep. 14, 2017

(51) Int. Cl.
*B08B 9/032* (2006.01)
*E03F 9/00* (2006.01)
*B08B 9/00* (2006.01)
*B08B 3/02* (2006.01)
*C09K 11/77* (2006.01)

(52) U.S. Cl.
CPC ............ *E03F 9/007* (2013.01); *B08B 3/02* (2013.01); *B08B 9/00* (2013.01); *C09K 11/7728* (2013.01)

(58) Field of Classification Search
None
See application file for complete search history.

(56) References Cited

U.S. PATENT DOCUMENTS

2015/0129075 A1* 5/2015 Walsh .................. F16L 11/12
138/103

* cited by examiner

*Primary Examiner* — Mikhail Kornakov
*Assistant Examiner* — Ryan L. Coleman
(74) *Attorney, Agent, or Firm* — John R. Ross; John R. Ross, III

(57) ABSTRACT

A method for tracking the location of a sewage hose. A sewage main line hose is connected to a sewage truck. A phosphorescent leader hose is connected to the end of the main line hose. A nozzle is connected to the end of the phosphorescent leader hose. The glow of the phosphorescent leader hose is observable in a dark sewage line. The location of the main line hose and the nozzle can be easily determined after observing the glow from the phosphorescent leader hose. In a preferred embodiment the phosphorescent leader hose utilizes europium phosphorescent powder for its phosphorescent properties.

4 Claims, 6 Drawing Sheets

METHOD FOR TRACKING THE LOCATION OF A SEWAGE HOSE THROUGH DARK SEWAGE PIPES

The present invention relates to high pressure sewage hoses, and in particular, to methods for viewing the location of high pressure sewage hoses in dark locations.

BACKGROUND OF THE INVENTION

In the sewage waste water industry, high pressure hoses are needed to clear and clean the sewage pipes. Sewage trucks are utilized that have large reels having the high pressure main line water hoses. Sewage trucks are also known as combination sewer cleaning trucks, combination trucks, jetters or jetter trucks. The main line can be of varying lengths up to approximately 1000 feet and can have a working pressure of anywhere from 2000-3000 psi. The main line hoses are color-coordinated with the color referring to the water pressure that the truck's pumps can generate.

At the beginning and end of the main line hose there is a leader hose (also referred to as a guide hose or Pilot hose). The leader hoses are more flexible and they have a higher working pressure than the main line hose. The leader hoses are used to lead the main line hose around turns and bends. A high pressure nozzle is connected to the end of the leader hose.

As an industry standard the leader hoses are black. They are extremely difficult to see in dark sewage lines. Workers may use mirrors or flashlights to help them see in the sewage line.

A function of the leader hose is to let the worker know the distance from the nozzle to the end of the main line hose. For example, the workers may see that they have 10 feet left or 15 feet left depending on the length of the leader hose. Leader hoses may be as long as 25 feet. It is important to know where the main line hose is in order to save the main line hose from any unnecessary damage. Unfortunately, as stated above, leader hoses are very hard to see because they are black. Also manhole depths can be high, up to 30 feet.

Europium Phosphorescent Material

Europium phosphorescent powders are a new generation of glow material. The europium phosphorescent powder provides glow much better than the zinc sulfide phosphorescent materials more commonly known. For example, green and aqua glow europium phosphorescent powders will remain clearly visible for as long a 30 hours sufficient light exposure. The length of time a glow powder will glow is defined as the time it takes for the afterglow brightness to diminish to 0.32 mod (0.32 mod is 100 times the human visible perception limit). Even at this level, the glow is clearly visible in darkness. Europium phosphorescent powder is available from United Nuclear Scientific with offices in Laingsburg, Mich.

SUMMARY OF THE INVENTION

The present invention provides a method for tracking the location of a sewage hose. A sewage main line hose is connected to a sewage truck. A phosphorescent leader hose is connected to the end of the main line hose. A nozzle is connected to the end of the phosphorescent leader hose. The glow of the phosphorescent leader hose is observable in a dark sewage line. The location of the main line hose and the nozzle can be easily determined after observing the glow from the phosphorescent leader hose. In a preferred embodiment the phosphorescent leader hose utilizes europium phosphorescent powder for its phosphorescent properties.

DETAILED DESCPRIPTION OF THE PREFERRED EMBODIMENTS

In a preferred embodiment of the present invention, the outermost layer of a sewage treatment leader hose is infused with a phosphorescent material. Preferably, the phosphorescent material is europium phosphorescent powder. The phosphorescent leader hose allows sewer workers to more easily seen the leader hose in dark sewers. By easily seeing the leader hose, workers always will have a good understanding of the location of the mainline hose and the nozzle attached to the end of the leader hose.

Preparation of the Outer Phosphorescent Rubber Layer

Figure 1:
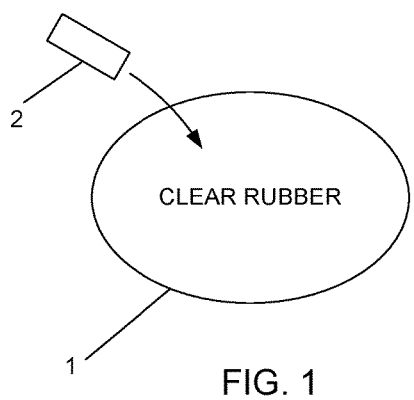
FIGS. 1-18 show a preferred method for fabricating a phosphorescent leader hose.
Figure 2:
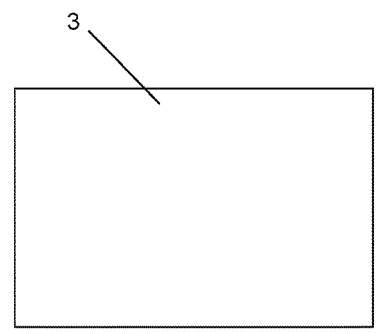

In a preferred embodiment of the present invention, a worker will add Europium Phosphorescent powder 2 to the clear rubber 1 as it is being milled (FIG. 1). During the milling process, the rollers of the mill heat, soften and smooth the rubber into an even texture. Clear rubber is preferred because it allows for greater visibility of the diffused europium phosphorescent powder throughout the rubber layer. At the end of the milling process the mill produces smooth rubber sheets 3 (FIG. 2).

Preparation of Interior Rubber Layers

Other layers of rubber are also milled in a similar fashion.

In a preferred embodiment, at least one layer is colored white. The white layer is to be positioned directly underneath the outermost phosphorescent layer to increase visibility of the phosphorescent layer due to the high reflective properties of white. In one preferred embodiment the white layer is created by adding a white colored pigment to rough rubber strip during the milling process.

Cut Rubber Layers into Strips

Figure 3:
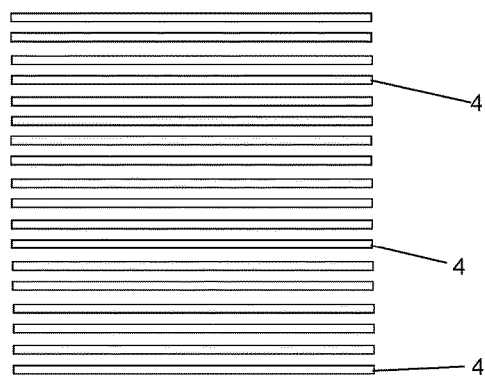

In FIG. 3 milled rubber sheet 3 has been cut into strips 4. Strips 4 have been cut to the precise width and thickness required for the size of the hose that will be constructed. The strips are then wound preferably wound into production rolls. The rolls are interleaved with transparent poly liner film.

Attachments Placed on Mandrill

Figure 4:
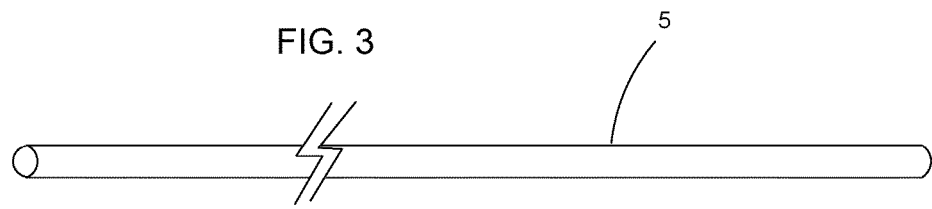

FIG. 4 shows steel mandrill 5. Steel mandrill 5 is the exact size of the hose bore. Steel mandrill 5 is lubricated.

Figure 5:
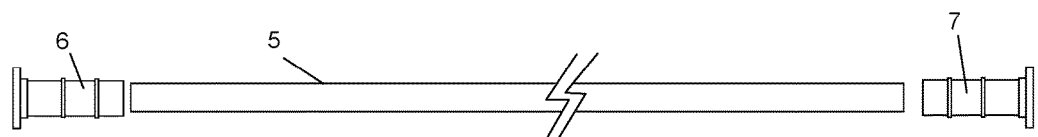

In FIG. 5 attachments 6 and 7 are adjacent mandrill 5. Attachments 6 and 7 are utilized to connect the hose to another hose section or to attach a hose device (such as a nozzle) to the end of the hose.

Figure 6:
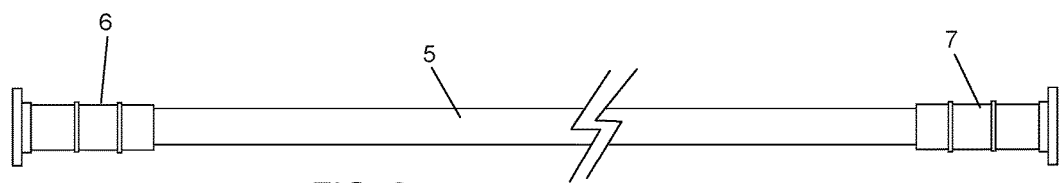

In FIG. 6 attachments 6 and 7 have been placed on mandrill 5.

First Rubber Layer

Figure 7:
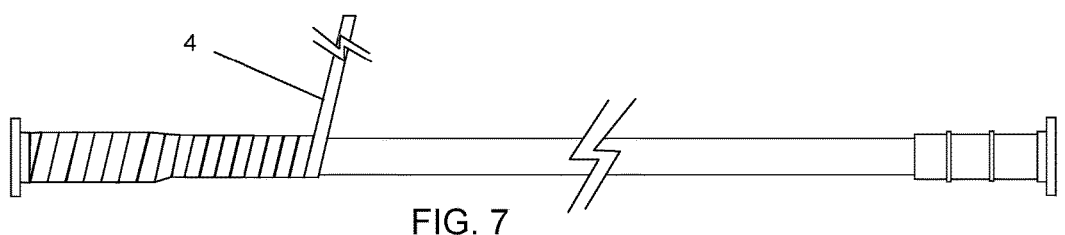

In FIG. 7 the worker is wrapping first rubber strip 4 around attachments 6 mandrill 5. It is being wrapped at an angle so that it overlaps. The worker measures as he adds the angles to make sure he has the correct overall thickness.

Figure 8:
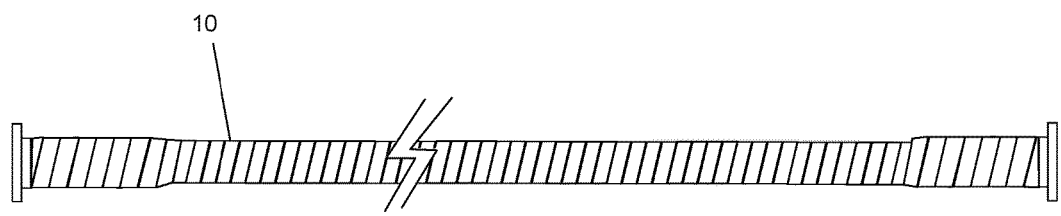
Figure 9:
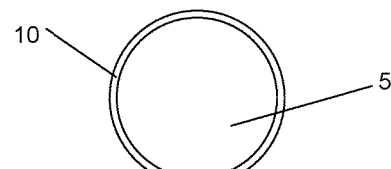

In FIG. 8 the worker has finished wrapping rubber strip 4 around mandrill 5 to create first layer 10 (FIG. 9).

Four Layers of Rubber Coated Synthetic Fabric

Figure 10:
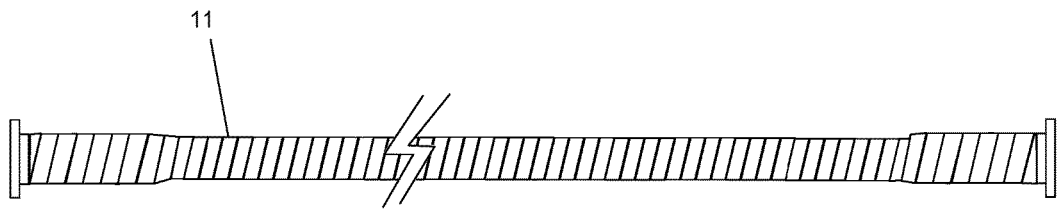
Figure 11:
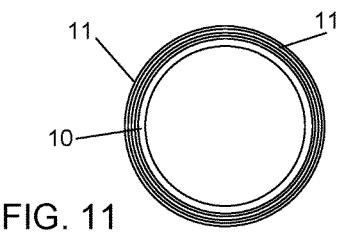

On top of first rubber layer 10, in FIG. 10 the worker has wrapped four layers of high strength rubber coated synthetic fabric 11 (FIG. 11). Rubber coated synthetic fabric 11 reinforces the hose so that it does not burst under pressure.

Finer Strips of Fabric Wrapped Around Attachments

Figure 12:
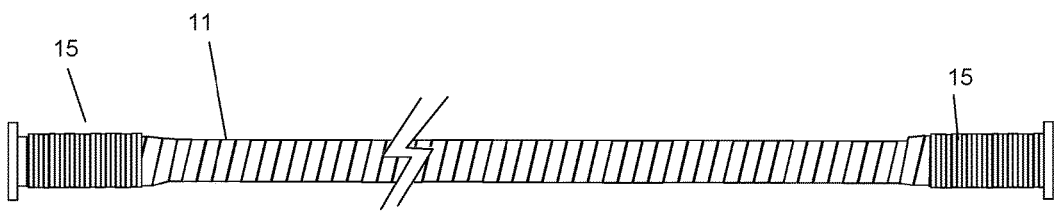

In FIG. 12, the worker has wrapped fine strips of rubber coated synthetic fabric 15 around attachments 6 and 7 for extra strength.

Nylon Tape is Applied and Removed

Figure 13:
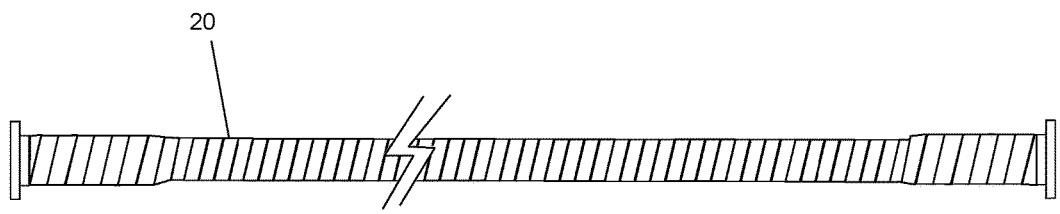

In FIG. 13, the hose is wrapped very tightly with high strength nylon tape 20. Air is expelled as the rubber layers are squeezed together. After a few minutes the worker removes the nylon tape.

Carbon Steel Wire

Figure 14:
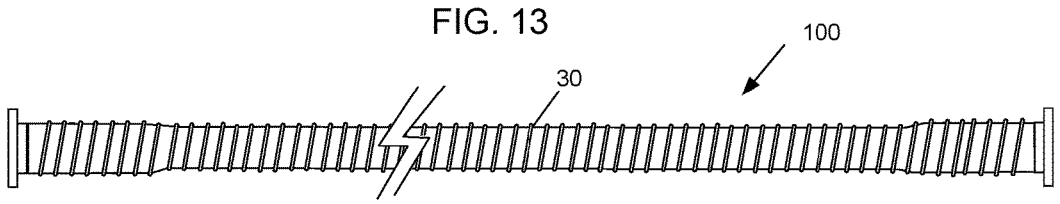

In FIG. 14, carbon steel wire 30 is wrapped around the hose 100. This prevents hose 100 from kinking and collapsing under vacuum pressure.

Last Layers of Rubber

Figure 15:
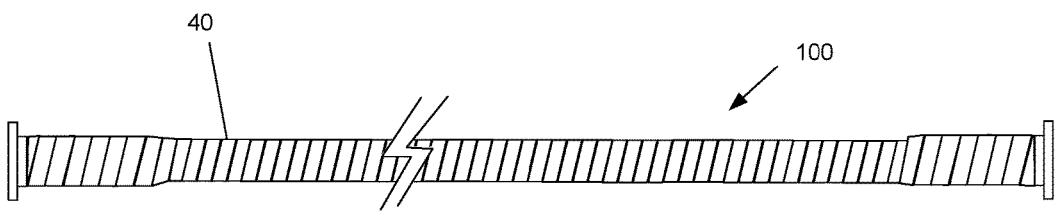
Figure 16:
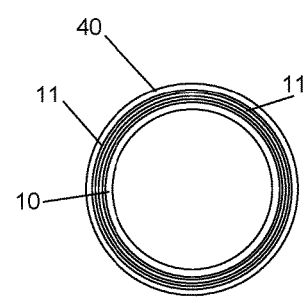

In FIG. 15, a white colored layer 40 of rubber is applied (FIG. 16).

Figure 17:
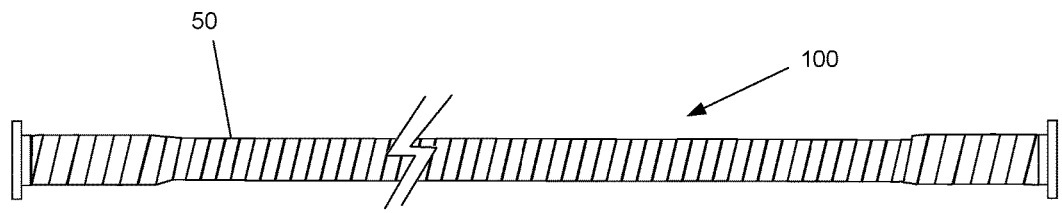
Figure 18:
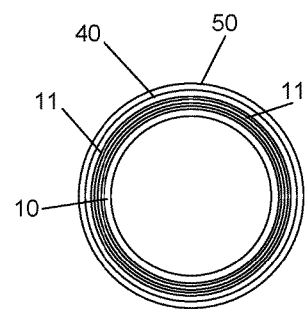

In FIG. 17 the outermost layer 50 of rubber is applied (FIG. 18). Outermost layer 50 is fabricated from clear rubber having the addition of Europium Phosphorescent powder 2 (see above description).

Steps Before Curing

Hose 100 is wrapped tightly with wet nylon tape. This tape will later shrink and compress all the materials together during the curing process. After the wet nylon tape is applied the worker wraps the hose in rope to create corrugations. The worker then adds another layer of wet shrinkable nylon tape to hold the rope in place.

Vulcanization

Hose 100 is then vulcanized to cure the rubber and give it elasticity. During the vulcanization process, hose 100 is heated in an autoclave at 150 degrees Celsius for approximately an hour. The heating process vulcanizes the rubber and shrinks the nylon tape, compressing the rubber layers together.

Finishing

After vulcanization, the workers can then remove the nylon tape from hose 100. They nylon tape may be reused as needed Soapy water is pumped between innermost rubber layer 10 and mandrill 5. Hose 100 is then easily removed from mandrill 5.

Utilization of Phosphorescent Leader Hose

Figure 19:
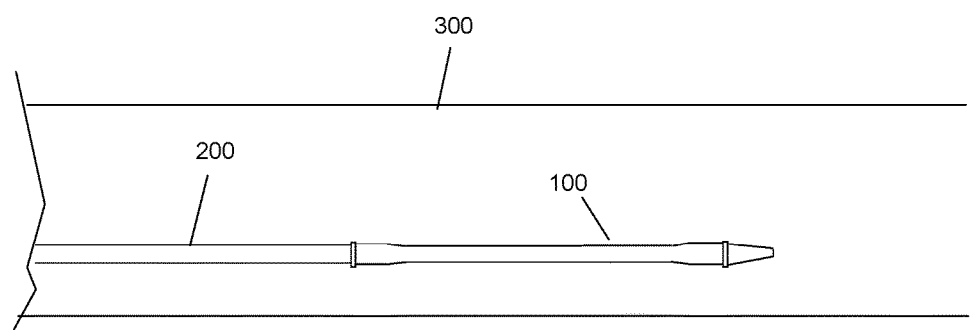
FIGS. 19-20 show a preferred method for utilizing a phosphorescent leader hose for tracking the location of a main line hose and nozzle.

FIG. 19 shows main line hose 200 inserted into sewer 300. Leader hose 100 is connected to the distal end of main line hose 200 as shown. As explained above, leader hose 100 is phosphorescent. This allows a worker walking through sewer 300 to realize when he is approaching the end of the hose. In a preferred embodiment leader hose 100 is approximately 15 feet. Emporium phosphorescent leader hose 100 emits a long lasting light that can last up to approximately 10 hours. Therefore a worker will not need to rely on a flashlight to know when he is approaching the end of the hose.

Figure 20:
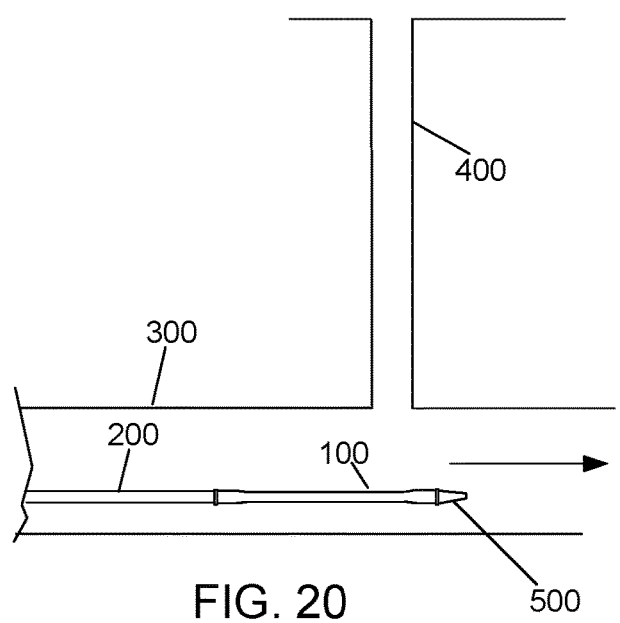

In FIG. 20 a worker is positioned at the top of manhole 400. The distance from top of manhole 400 to sewer line 300 is approximately 30 feet. The worker can easily see the glow of phosphorescent leader hose 100 from the top of manhole 400. If leader hose 100 is 15 feet long, the worker has a very good understanding the position of main line hose 200 and nozzle 500 as main line hose 200 is being pulled through sewer line 300.

Although the above-preferred embodiments have been described with specificity, persons skilled in this art will recognize that many changes to the specific embodiments disclosed above could be made without departing from the spirit of the invention. For example, although it was stated above that leader hose 100 is preferably fabricated utilizing rubber layers, it is also possible to utilize layers that are a rubber blend hose. For example, outer layers 40 and 50 can also be a hybrid polymer rubber blend hose that includes both rubber for flexibility and polyvinyl chloride (PVC) for its abrasive properties. Therefore, the attached claims and their legal equivalents should determine the scope of the invention.

What is claimed is:

1. A method for tracking the location of a sewage hose, comprising the steps of:
  A. obtaining a main line hose;
  B. connecting a first end of said main line hose to a truck;
  C. connecting a phosphorescent leader hose to a second end of said main line hose, wherein said phosphorescent leader hose has a known length, wherein said leader hose comprises an outer rubber layer of clear rubber infused with europium phosphorescent powder, and wherein said leader hose comprises a white inner rubber layer adjacent to said outer rubber layer;
  D. connecting a nozzle to said leader hose, and moving said nozzle and leader hose through a sewage line;
  E. observing said the glow of said phosphorescent leader hose in the sewage line; and
  F. calculating the location of said main line hose and said nozzle after said step of observing said glow, said calculation based on said known length of said leader hose.

2. The method as in claim 1, wherein said outer rubber layer and said inner rubber layer are both rubber blends.

3. The method as in claim 1, wherein said outer rubber layer is a clear rubber blend infused with europium phosphorescent powder, and said inner rubber layer is a rubber blend.

4. The method as in claim 1, wherein said outer rubber layer and said inner rubber layer are both hybrid polymer blend layers comprising rubber and polyvinyl chloride.

* * * * *